(12) United States Patent
Jan et al.

(10) Patent No.: US 10,374,671 B2
(45) Date of Patent: *Aug. 6, 2019

(54) COMPLEX ANTENNA

(71) Applicant: Wistron NeWeb Corporation, Hsinchu (TW)

(72) Inventors: Cheng-Geng Jan, Hsinchu (TW); Chieh-Sheng Hsu, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 179 days.

This patent is subject to a terminal disclaimer.

(21) Appl. No.: 15/428,125

(22) Filed: Feb. 8, 2017

(65) Prior Publication Data

US 2018/0076864 A1    Mar. 15, 2018

(30) Foreign Application Priority Data

Sep. 10, 2016   (TW) .............................. 105129421 A

(51) Int. Cl.
| | | |
|---|---|---|
| *H01Q 21/00* | (2006.01) | |
| *H04B 7/0456* | (2017.01) | |
| *H01Q 9/04* | (2006.01) | |
| *H01Q 19/10* | (2006.01) | |
| *H04B 7/06* | (2006.01) | |
| *H01Q 1/36* | (2006.01) | |
| *H01Q 1/42* | (2006.01) | |
| *H01Q 9/28* | (2006.01) | |
| *H01Q 15/14* | (2006.01) | |
| *H01Q 21/20* | (2006.01) | |
| *H01Q 21/24* | (2006.01) | |
| *H01Q 21/28* | (2006.01) | |

(52) U.S. Cl.
CPC ............ *H04B 7/0469* (2013.01); *H01Q 1/36* (2013.01); *H01Q 1/42* (2013.01); *H01Q 9/0414* (2013.01); *H01Q 9/0421* (2013.01); *H01Q 9/0457* (2013.01); *H01Q 9/28* (2013.01); *H01Q 15/14* (2013.01); *H01Q 19/10* (2013.01); *H01Q 21/205* (2013.01); *H01Q 21/24* (2013.01); *H01Q 21/28* (2013.01); *H04B 7/0697* (2013.01)

(58) Field of Classification Search
None
See application file for complete search history.

(56) References Cited

U.S. PATENT DOCUMENTS

| | | | | |
|---|---|---|---|---|
| 8,674,882 B2* | 3/2014 | Huang | ...................... | H01Q 1/36 343/700 MS |
| 9,379,451 B2* | 6/2016 | Hsu | ...................... | H01Q 9/0414 |
| 2009/0204372 A1* | 8/2009 | Johnston | .................. | G01S 19/22 702/191 |
| 2009/0306646 A1* | 12/2009 | Turner | ................... | A61B 18/18 606/33 |
| 2012/0133567 A1* | 5/2012 | Harel | ....................... | H01Q 1/38 343/798 |

(Continued)

*Primary Examiner* — Trinh V Dinh
(74) *Attorney, Agent, or Firm* — Winston Hsu

(57) ABSTRACT

A complex antenna for receiving and transmitting radio signals, includes four unit antennas, circularly arranged along a circle, for receiving and transmitting radio signals of a first frequency band; four side walls, respectively disposed between two adjacent unit antennas of the four unit antennas; and a plurality of side-wall antennas, disposed on the four side walls, for receiving and transmitting radio signals of a second frequency band.

19 Claims, 6 Drawing Sheets

(56) References Cited

U.S. PATENT DOCUMENTS

| | | |
|---|---|---|
| 2012/0176945 A1* | 7/2012 | Hartenstein .......... H04B 7/0413 370/297 |
| 2012/0214425 A1* | 8/2012 | Huang .................... H01Q 1/36 455/73 |
| 2014/0191919 A1* | 7/2014 | Hsu ...................... H01Q 9/0414 343/837 |
| 2015/0215011 A1 | 7/2015 | Hartenstein |
| 2015/0256213 A1* | 9/2015 | Jan ....................... H04B 7/0602 370/338 |
| 2017/0085289 A1* | 3/2017 | Jan ........................... H04B 1/40 |
| 2018/0076864 A1* | 3/2018 | Jan ........................ H01Q 21/28 |

\* cited by examiner

COMPLEX ANTENNA

BACKGROUND OF THE INVENTION

1. Field of the Invention

The present invention relates to a complex antenna, and more particularly, to a complex antenna capable of effectively increasing spatial efficiency, resonance bandwidth and variety for design, to achieve multi-band or broadband operation.

2. Description of the Prior Art

With the advance of wireless communication technology, wireless communication systems, such as long term evolution (LTE) and wireless local area network (WEAN), support multi-input multi-output (MIMO) communication technology, i.e. an electronic product is capable of concurrently receiving/transmitting wireless signals via multiple (or multiple sets of) antennas, to vastly increase system throughput and transmission distance without increasing system bandwidth or total transmission power expenditure, thereby effectively enhancing spectral efficiency and transmission rate for the wireless communication system, as well as improving communication quality. Moreover, MIMO communication systems may employ techniques such as spatial multiplexing, beam forming, spatial diversity, pre-coding, etc. to further reduce signal interference and increase channel capacity.

A prerequisite for implementing spatial multiplexing and spatial diversity in MIMO is to employ multiple sets of antenna to divide a space into many channels, in order to provide multiple antenna field patterns. Therefore, it is a common goal in the industry to design antennas that suit both transmission demands, as well as dimension and functionality requirements. Additionally, it is also a common goal in the industry to design antennas that add antenna operating frequency bands under limited volume and cost, as well as adaptive beam forming ability.

SUMMARY OF THE INVENTION

Therefore, the present invention primarily provides a complex antenna, which is capable of increasing spatial efficiency, resonance bandwidth and variety for design.

The present invention discloses a complex antenna for receiving and transmitting radio signals, comprising four unit antennas, circularly arranged along a circle, for receiving and transmitting radio signals of a first frequency band; four side walls, respectively disposed between two adjacent unit antennas of the four unit antennas; and a plurality of side-wall antennas, disposed on the four side walls, for receiving and transmitting radio signals of a second frequency band.

These and other objectives of the present invention will no doubt become obvious to those of ordinary skill in the art after reading the following detailed description of the preferred embodiment that is illustrated in the various FIGS. and drawings.

DETAILED DESCRIPTION

Figure 1A:
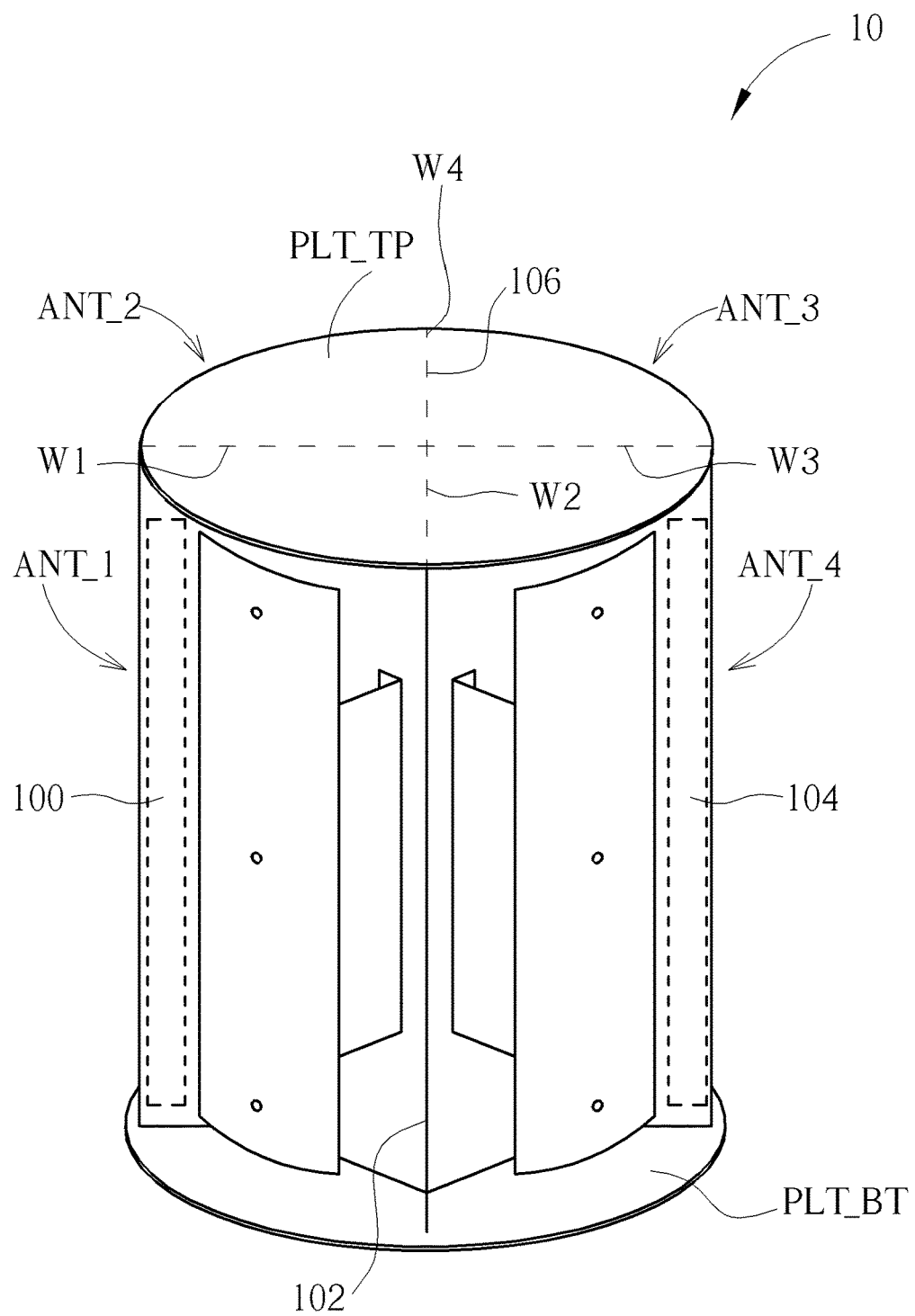
FIG. 1A is a schematic diagram of a complex antenna according to an embodiment of the present invention.
Figure 1B:
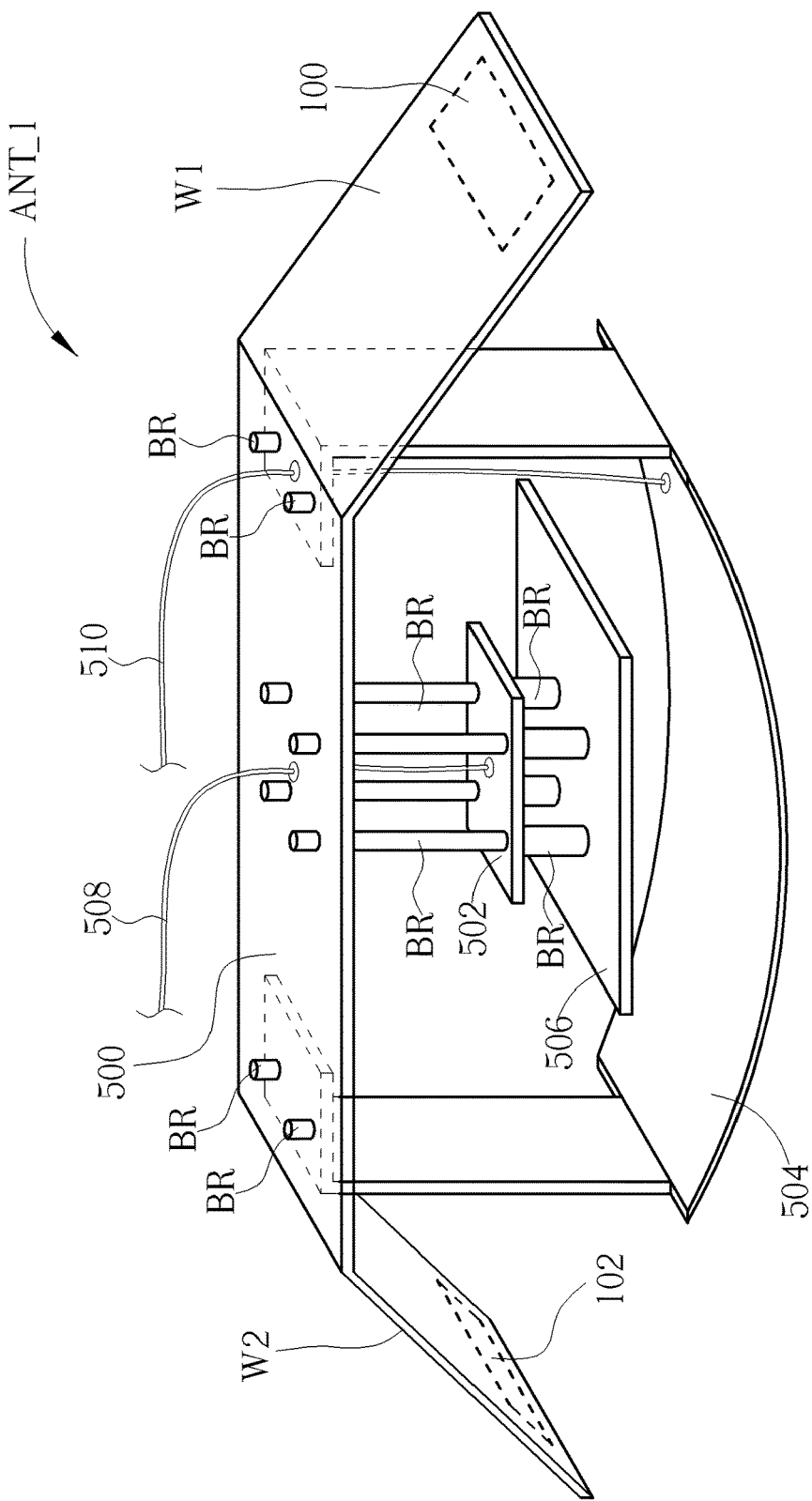
FIG. 1B is a schematic diagram of a unit antenna in the complex antenna in FIG. 1A.
Figure 1C:
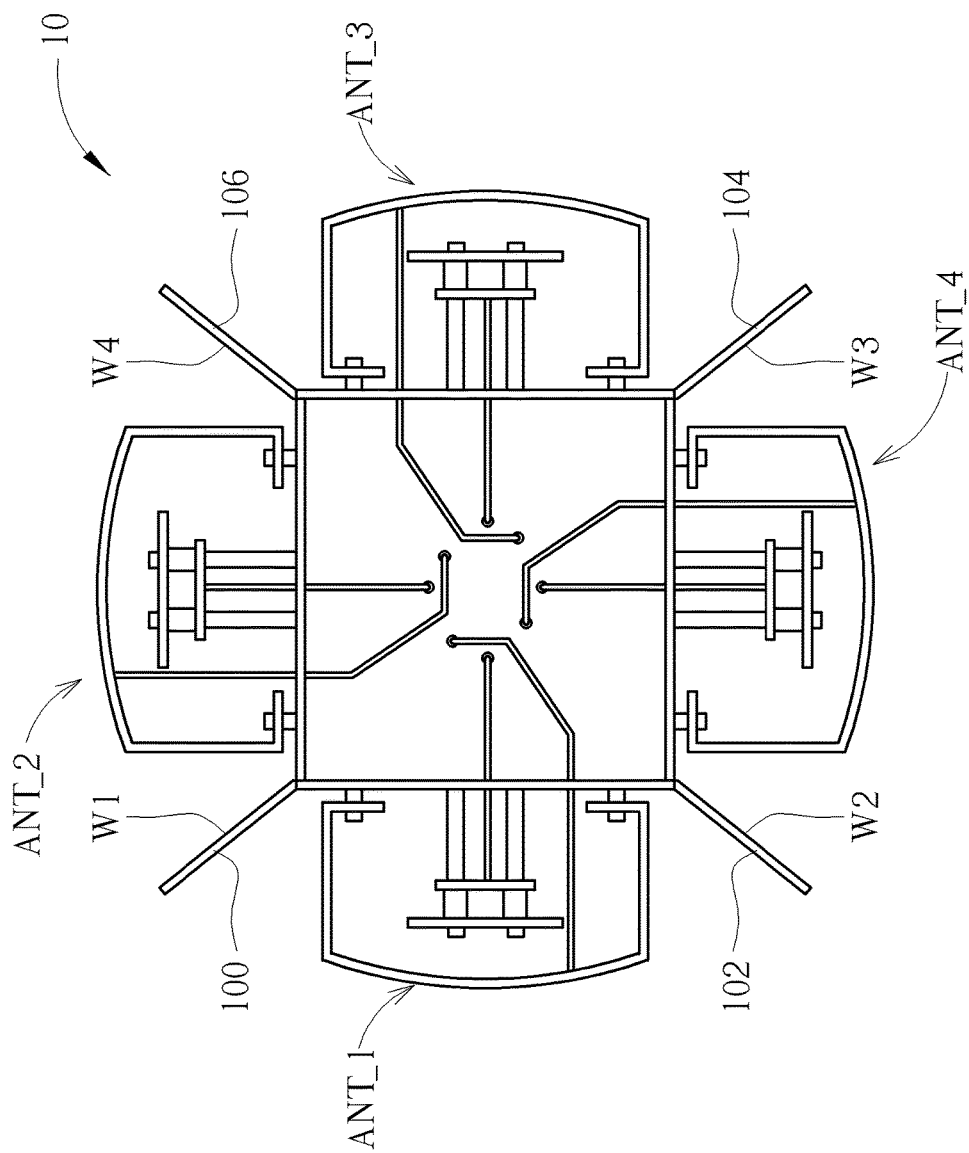
FIG. 1C is a cross-section schematic diagram of the complex antenna in FIG. 1A.

Please refer to FIG. 1A, which is a schematic diagram of a complex antenna 10 according to an embodiment of the present invention. The complex antenna 10 is formed by unit antennas ANT_1-ANT_4, a top plate PLT_TP, a bottom plate PLT_BT and side-wall antennas 100-106, and is accommodated for a MIMO system, e.g. LTE wireless communication system, etc. The top plate PLT_TP and the bottom plate PLT_BT are utilized to fix the unit antennas ANT_1-ANT_4, which may be properly modified or removed according to system requirements. Structures of the unit antennas ANT_1-ANT_4 may be identical or slightly different, and the basic concept of the unit antennas ANT_1-ANT_4 is formed by multi-layered patch plates. Taking the unit antenna ANT_1 as an example, as shown in FIGS. 1B and 1C, the unit antenna ANT_1 includes a ground metal plate 500, a first patch plate 502, a second patch plate 504 and a third patch plate 506, a first feed-in wire 508, a second feed-in wire 510 and eight cylinders BR. The cylinder BR is an insulation fixing unit for fixing the ground metal plate 500, the first patch plate 502, the second patch plate 504 and the third patch plate 506, such that they do not come in contact with each other, ensuring normal signal transmission or reception. Moreover, the ground metal plate 500 includes two bends, such that it appears to have two flanks, and serves to focus wave beams generated by the unit antenna ANT_1 within a predefined range. The second patch plate 504 also has multiple bends, aimed at reducing its expanded area (i.e. an area projected onto the ground metal plate 500). The first feed-in wire 508 and the second feed-in wire 510 are electrically connected to the first patch plate 502 and the second patch plate 504, respectively, for transmitting radio signals. The wire lengths of the first feed-in wire 508 and the second feed-in wire 510 are integer multiples of the half wavelength. The third patch plate 506 is disposed between the first patch plate 502 and the second patch plate 504, for increasing the resonance bandwidth.

In the unit antenna ANT_1, when emitting vertical polarization beams, the radio signals are fed into the first patch plate 502 through the first feed-in wire 508, and the radio signals are fed into the third patch plate 506 and the second patch plate 504 by an electromagnetic coupling method; in such a situation, different layers in the vertical direction have different feed-in methods, and the second patch plate 504 may be considered as a main radiating element. On the other hand, when emitting horizontal polarization beams, the radio signals are fed into the second patch plate 504 through the second feed-in wire 510, and the second patch plate 504 is the main radiating element. Therefore, with such multi-layered radiating element design, the unit antenna ANT_1 of the embodiment may effectively increase the resonance bandwidth, increase variety for design. More importantly, with the different feed-in methods for different layers in the vertical direction, horizontal and vertical polarizations are easily achieved, and isolation between the horizontal and vertical polarizations is improved.

Moreover, structures of the unit antennas ANT_2-ANT_4 are the same as that of the unit antenna ANT_1, and after combination, the complex antenna 10 forms a symmetric ring structure, as shown in FIG. 1C, which is a cross-section diagram of the complex antenna 10. Note that, in the complex antenna 10, the ground metal plates of the unit antennas ANT_1-ANT_4 are electrically connected, i.e. the unit antennas ANT_1-ANT_4 share a common ground. As such, it is possible to suitably adjust dimensions of the ground metal plates of the unit antennas ANT_1-ANT_4 to reduce manufacturing costs. For example, as shown in FIG. 1C, the ground metal plates of the unit antennas ANT_2, ANT_4 are only connected to the ground metal plates of the unit antennas ANT_1, ANT_3, omitting the two flanks. Obviously, it is possible for the unit antennas ANT_1-ANT_4 to all have identical structures, provided that their ground metal plates are all electrically connected to the same ground.

Furthermore, a switching circuit, e.g. a diode circuit, single-pole, single-throw (SPST) switching circuit with power splitters, etc., is required to implement a radio-frequency transceiver system, in order to accommodate the complex antenna 10 for a MIMO system, for switching a connection between the radio-frequency signal processing module and each of the feed-in wires, to control a specific unit antenna of the unit antennas ANT_1-ANT_4 to be horizontally or vertically polarized, so as to correctly receive/transmit the radio signals. In this way, not only specific wave beams are generated via the complex antenna 10, but field patterns of adjacent unit antennas can also be synthesized into a new field pattern, to compensate for an attenuation of peak gain value of each individual unit antenna after deviating from the 45-degree angle. Meanwhile, with the control of the switching circuit, 8-way singular antenna wave beams may be obtained by utilizing the unit antennas ANT_1-ANT_4 (wherein 4 ways are vertically polarized and 4 ways are horizontally polarized) and 8-way synthesized antenna wave beams (wherein 4 ways are vertically polarized and 4 ways are horizontally polarized), equivalent to a total of 16-way wave beams.

As mentioned above, in the complex antenna 10, the unit antennas ANT_1-ANT_4 are circularly arranged along a circle (i.e. corresponding to a quadrate of a circle), and utilize the switching circuit to obtain the 8-way singular antenna wave beams (wherein 4 ways are vertically polarized and 4 ways are horizontally polarized) and 8-way synthesized antenna wave beams (wherein 4 ways are vertically polarized and 4 ways are horizontally polarized), equivalent to a total of 16-way wave beams to effectively increase spatial efficiency, resonance bandwidth and variety for design, and adapt to the applications of the MIMO system.

The complex antenna 10 further comprises the side-wall antennas 100-106, which may be slot antennas, planar inverted-F antennas or other types of planar antennas. Appropriate selection for types and dimensions of the side-wall antennas 100-106 may increase operating frequency bands or bandwidth of the complex antenna 10. In detail, the ground metal plates of the unit antennas ANT_1-ANT_4 (i.e. the ground metal plate 500 shown in FIG. 1B) form the side walls W1-W4 between the unit antennas ANT_1-ANT_4, and the side-wall antennas 100-106 respectively form on the side walls W1-W4. In other words, each side wall and the other three side walls have included angles of 90, 180 and 270 degrees, respectively, and thus, the side-wall antennas 100-106 are disposed in four vertical directions. As such, appropriate design for the types and dimensions of the side-wall antennas 100-106 may increase the operating frequency bands or bandwidth.

Figure 2:
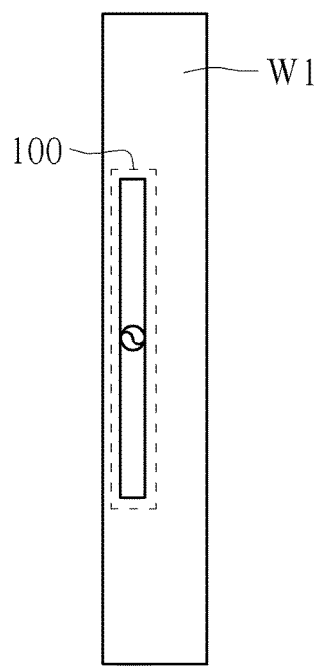
FIGS. 2, 3A-3D and 4 are different schematic diagrams of a side wall and a side-wall antenna in FIG. 1A.

For example, please refer to FIG. 2, which is a schematic diagram of the side wall W1 and the side-wall antenna 100 when the side-wall antennas 100-106 are implemented by the slot antennas. The side walls W2-W4 and the side-wall antennas 102-106 may have the same structure as shown in FIG. 2. Since the side walls W1-W4 are respectively toward four vertical directions, when the side-wall antennas 100-106 are implemented by the slot antennas, the set of side-wall antennas in the same horizontal plane, such as the side-wall antennas 100 and 104 taken as a set and the side-wall antennas 102 and 106 taken as another set, have similar radiation field patterns. While the radiation field patterns of different sets of the side-wall antennas are complementary to each other, i.e. the weakest field position of the side-wall antennas 100 and 104 is substantially identical to the strongest field position of the side-wall antennas 102 and 106, and the weakest field position of the side-wall antennas 102 and 106 is substantially identical to the strongest field position of the side-wall antennas 100 and 104. As such, the side-wall antennas 100 and 104 may be combined as a 2-in-2-out antenna, and similarly, the side-wall antennas 102 and 106 may be combined as another 2-in-2-out antenna to increase a lowest antenna gain of a whole.

Note that, FIG. 2 illustrates that the side-wall antennas 100-106 may be implemented by the slot antennas, and those skilled in the art may appropriately adjust the sizes and types of the slot antennas according to system requirements. For example, in an embodiment, a length and a width of the slot antenna may be substantially set as 108 mm and 8 mm to meet requirements of Band 4 (1710 MHz-1755 MHz, 2110 MHz-2155 MHz) of the LTE system. In this way, if the unit antennas ANT_1-ANT_4 are operated in Band 13, the complex antenna 10 may simultaneously meet the requirements of Band 13 and Band 4 of the LTE system. On the other hand, except for single slot of the slot antenna shown in the FIG. 2, other types of slot antennas, such as horn-shape, double-slot and so on, may be utilized to implement the side-wall antennas 100-106.

In addition, all kinds of modifications to the slot antennas may be accommodated for the present invention. For example, a position of a feed-in point may be retracted to shorten a total length of the slot antenna and include other antenna units on the side wall. The retraction of the position of the feed-in point makes the feed-in point closer to a central axis, which shortens a length of a transmission line, decreases transmission loss and increases antenna gains. Meanwhile, the slot antenna may have a bowtie shape to increase bandwidth. For example, please refer to FIGS. 3A to 3D, which are different schematic diagrams of the side wall W1 and the side-wall antenna 100 when the side-wall antennas 100-106 are implemented by the slot antennas of bowtie type (hereinafter, named bowtie slot antennas). The side walls W2-W4 and the side-wall antennas 102-106 have the identical structure. FIGS. 3A to 3D show the bowtie slot antenna, and the side wall W1 includes different antenna units because of the retraction of the position of the feed-in point. In more detail, the slot antenna in FIG. 3A retracts the position of the feed-in point and simultaneously adopts the bowtie structure. The retraction of the position of the feed-in point shortens the total length of the slot antenna, and makes the position of the feed-in point closer to the central axis to shorten the length of the transmission line and increase the antenna gains. Besides, a bowtie dipole antenna usually has characteristics of larger bandwidth, and the example of FIG.

3A applies the characteristics in arms of open-slot antennas with a half-bowtie shape to improve the characteristics of the resonance, increase resonance bandwidth and simultaneously meet requirements of the isolation.

Figure 3A:
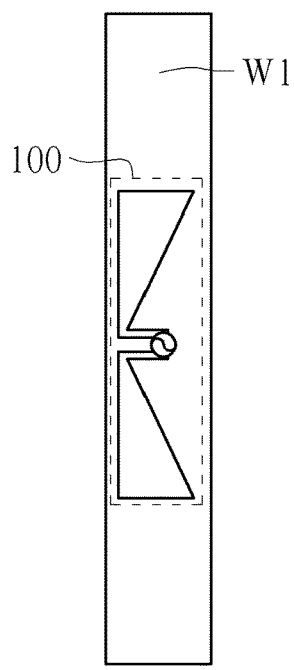
Figure 3B:
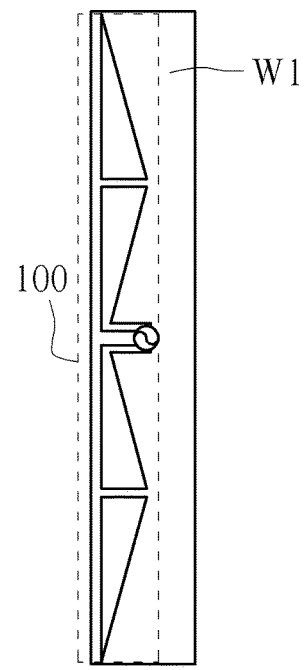

Furthermore, the example of FIG. 3B is the slot antenna shown in FIG. 3A added with a parasitic coupled resonator. Traditionally, adding the parasitic coupled resonator to the dipole antenna can increase bandwidth of the dipole antenna. FIG. 3B is the example which applies the characteristics on the slot antenna in FIG. 3A, to add a pair of open-slot right triangular parasitic coupled resonators to the end of the antenna arms of the bowtie slot antennas, such that a short leg of the right triangular parasitic coupled resonator couples to a half-bowtie slot antenna, which, in comparison to the slot antenna shown in FIG. 3A, improves the resonance of the slot antenna, increases the resonance bandwidth and simultaneously increases the isolation between adjacent antennas.

Figure 3C:
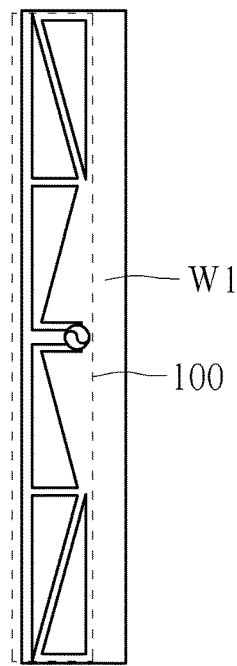

Next, the example of FIG. 3C is the slot antenna shown in FIG. 3B added with another parasitic coupled resonator to further increase the resonance bandwidth of the antenna. In other words, the example of FIG. 3C is the (first pair of) triangular parasitic coupled resonator shown in FIG. 3B added with another pair (a second pair) of open-slot triangular parasitic coupled resonator. As such, the two pairs of the triangular parasitic coupled resonators couple to each other through the long leg to further improve the characteristics of the resonance, increase the resonance bandwidth, simultaneously increase the isolation between the adjacent antennas, and the antenna gains as well.

Figure 3D:
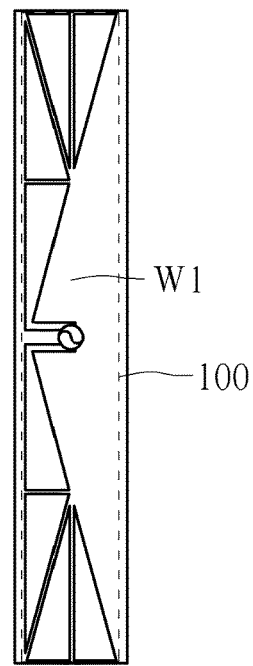

Additionally, the example of FIG. 3D is the slot antenna shown in FIG. 3C added with another parasitic coupled resonator to further increase the resonance bandwidth of the antenna. In other words, the example of FIG. 3D is the second pair of triangular parasitic coupled resonator shown in FIG. 3C added with another pair (a third pair) of open-slot triangular parasitic coupled resonator. As such, the second and third pairs of triangular parasitic coupled resonators couple to each other through the long leg of the right triangle to further improve the characteristics of the resonance, increase the resonance bandwidth, simultaneously increase the isolation between the adjacent antennas, and the antenna gains as well.

Note that, FIGS. 3B to 3D are sequentially adding the right triangular parasitic coupled resonators to the example of FIG. 3A to improve the characteristics of the resonance bandwidth, isolation, antenna gains and so on, but not limited thereto. Other shapes of parasitic coupled resonators may be applied to the present invention, such as a trapezoid, an isosceles triangle and so on. Meanwhile, FIGS. 3A to 3D are utilized to explain the types of the side-wall antennas 100-106 are not limited to specific antennas, which can be appropriately modified by those skilled in the art according to the system.

Figure 4:
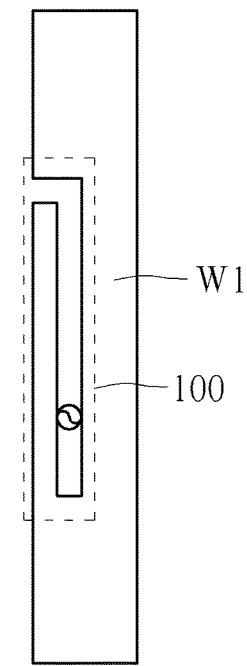

Other than the slot antennas, the side-wall antennas 100-106 may be implemented by the planar inverted-F antennas (PIFA). For example, FIG. 4 is a schematic diagram of the side wall W1 and the side-wall antennas 100 when the side-wall antennas 100-106 are implemented by the PIFA. The side walls W2-W4 and the side-wall antennas 102-106 have the identical structures. The operating principles of the PIFA are well known in the art, which has advantages of high radiation efficiency, easy to realize multiple operating frequency bands, and have a length of quarter wavelength (half of a half-wavelength antenna). Thus, the PIFA can incorporate with the operation of the unit antennas ANT_1-ANT_4 to increase the operating frequency bands and bandwidth of the complex antenna 10, and shorten a height of the complex antenna 10. Meanwhile, the feed-in wires may include filters, such as coaxial choke, to further meet the requirements of different frequency bands, which still belongs to the scope of the present invention.

The embodiments mentioned in FIGS. 2 to 4 illustrate that the slot antennas, the PIFA may be utilized to implement the side-wall antennas 100-106, but not limited thereto, any planar antenna that can be disposed on the side walls W1-W4 may be utilized in the present invention. In addition, those skilled in the art should know that types, dimensions, materials and so on may influence performances and field patterns of antennas; thus, those skilled in the art may choose appropriate antennas to implement the side-wall antennas 100-106 according to system requirements. Moreover, in the embodiments mentioned above, the side walls W1-W4 only include a single side-wall antenna respectively, but not limited thereto. In fact, each side wall may include multiple side-wall antennas, and different side walls may have different amounts of side-wall antennas thereon, which belongs to the scope of the present invention.

Figure 5:
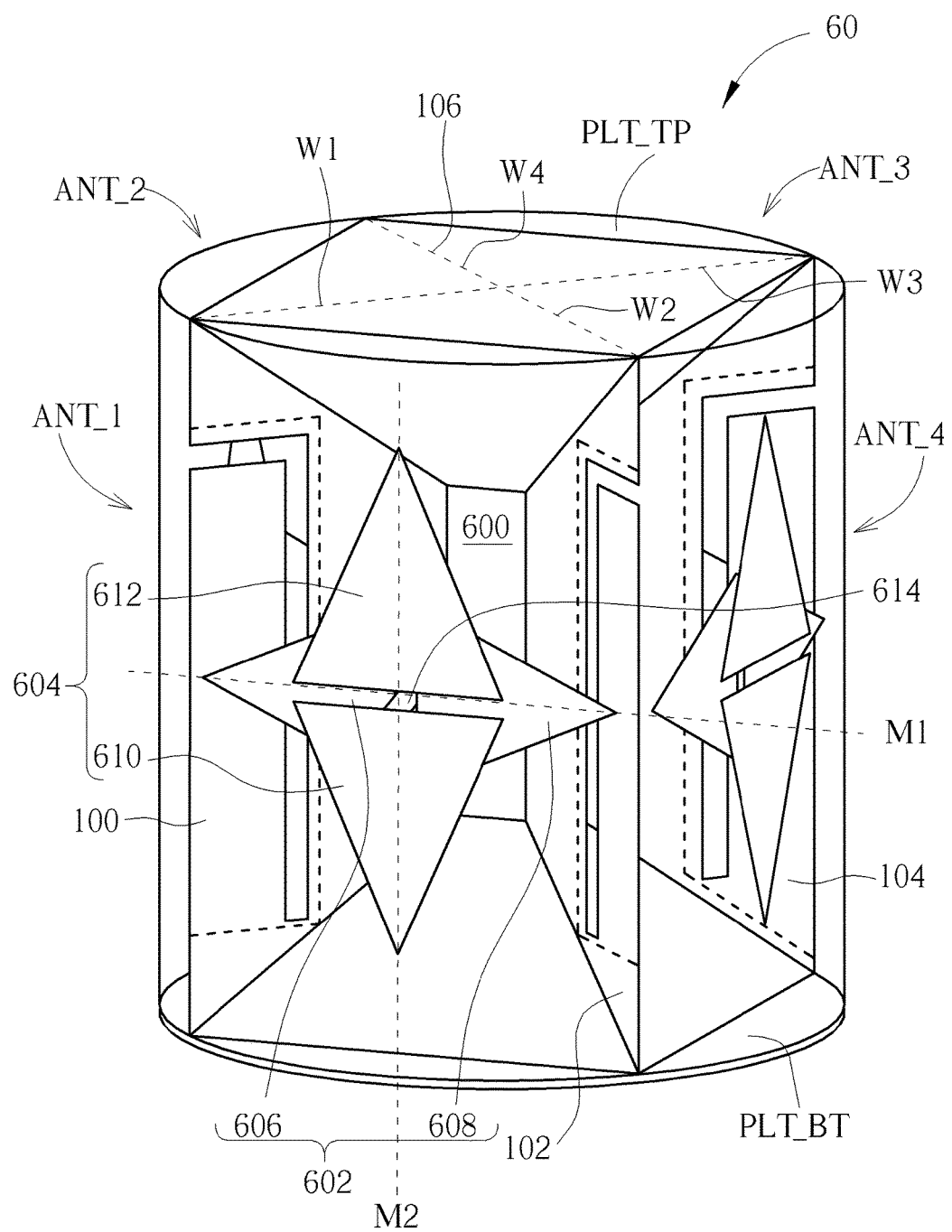
FIG. 5 is a schematic diagram of a complex antenna according to an embodiment of the present invention.
Figure 6:
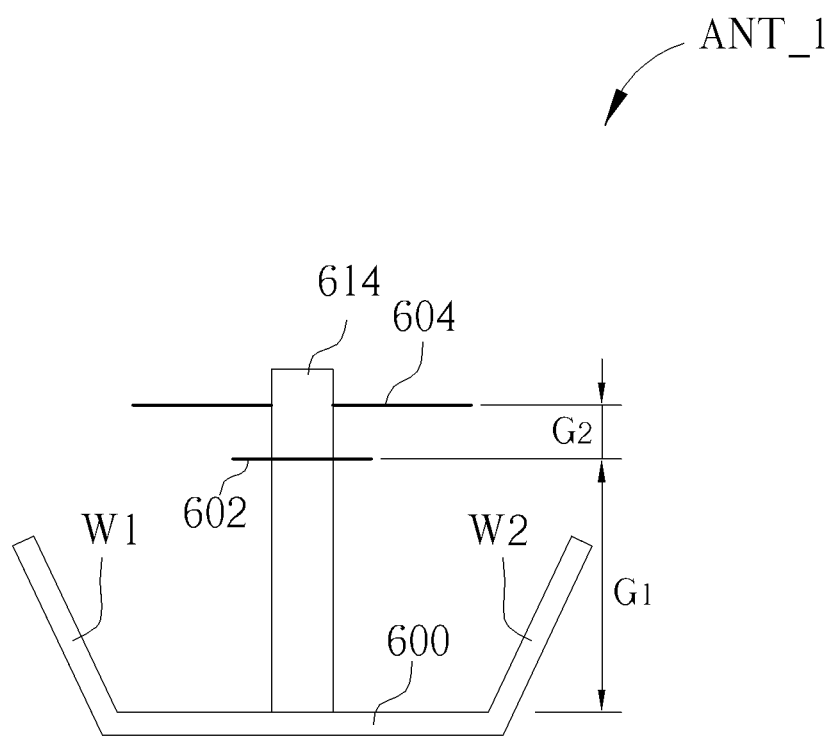
FIG. 6 is a side-view diagram of a unit antenna of the complex antenna shown in FIG. 5.

Furthermore, as mentioned above, the unit antennas ANT_1-ANT_4 may also be implemented by other antennas, but not limited to the examples mentioned above. For example, please refer to FIG. 5, which is a schematic diagram of a complex antenna 60 according to an embodiment of the present invention. The complex antenna 60 and the complex antenna 10 have the same structure, and the difference therebetween is that the unit antennas ANT_1-ANT_4 are implemented by a three-dimensional antenna of a dual-diamond dipole antenna structure, and the side-wall antennas 100-106 are implemented by the PIFA. In more detail, please refer to FIG. 6, which is a side-view diagram of the unit antenna ANT_1 shown in FIG. 5. In this example, the unit antenna ANT_1 comprises a metal reflective plane 600, a first radiation portion 602, a second radiation portion 604, and a supporting element 614. The metal reflective plane 600 is utilized for reflecting radio signals, to enhance gains of the complex antenna 60. The first radiation portion 602 is disposed on the metal reflective plane 600 with a first gap G1 to the metal reflective plane 600 and comprises a first triangular metal plate 606 and a second triangular metal plate 608. A base of the first triangular metal plate 606 is parallel to a base of the second triangular metal plate 608, such that the first radiation portion 602 conforms to a rhombus. The second radiation portion 604 is disposed on the first radiation portion 602 with a second gap G2 to the first radiation portion 602 and comprises a third triangular metal plate 610 and a fourth triangular metal plate 612. A base of the third triangular metal plate 610 is parallel to a base of the fourth triangular metal plate 612, such that the second radiation portion 604 conforms to a rhombus. In the embodiment, the first, second, third and fourth triangular metal plate 606, 608, 610 and 612 conform to isosceles triangles, but are not limited thereto. An angle between a first midline M1 of the first radiation portion 602 and a second midline M2 of the second radiation portion 604 is substantially equal to 90 degrees. The supporting element 614 is substantially perpendicular to the metal reflective plane 600 and is utilized for supporting the metal reflective plane 600, the first radiation portion 602, and the second radiation portion 604, such that the metal reflective plane 600, the first radiation portion 602, and the second radiation portion 604 are not electrically connected to each other. Under the structure, the polarization of the unit antenna ANT_1 is a dual (vertical and horizontal) polarization antenna.

In addition, note that, the dual (vertical and horizontal) polarization of the unit antenna ANT_1 is an embodiment, and the polarization of the unit antenna ANT_1 may be 45-degree and 135-degree slant polarized as well, but not limited thereto. In short, the unit antenna ANT_1 of the complex antenna 60 receives and transmits wireless signals through the first radiation portion 602 and the second radiation portion 604, which are 45-degree slant polarized. Therefore, projections of the first midline M1 and the second midline M2 on the metal reflective plane 600 substantially match with diagonal lines of the metal reflective plane 600 (i.e. the first radiation portion 602 is 45-degree slant polarized and the second radiation portion 604 is 135-degree slant polarized).

Note that, the complex antenna 60 is an embodiment of the present invention. Those skilled in the art should make modifications or alterations accordingly. For example, edge lengths of the metal reflective plane 600 may be modified according to the system requirements, and are not fixed. On the other hand, the first gap G1 is related to the operating frequency of the complex antenna 60. In general, when the first gap G1 is substantially equal to a quarter of a wavelength of wireless signals, the complex antenna 60 can reach a maximum gain. Besides, the second gap G2 is utilized for enhancing isolation between the first radiation portion 602 and the second radiation portion 604, to decrease interference between dual polarization antennas. Certainly, for obtaining higher isolation, the second gap G2 (i.e. a distance between the first radiation portion 602 and the second radiation portion 604) may be increased appropriately. However, increasing the second gap G2 may cause variations of other characteristics (such as gains and field patterns) of the complex antenna 60. Those skilled in the art should adjust the second gap G2 according to different applications. Finally, the supporting element 614 is made of an isolation material (such as wood, glass, rubber), but is not limited thereto. The supporting element 614 may be made by other materials, as long as the metal reflective plane 600, the first radiation portion 602, and the second radiation portion 604 are not electrically connected to each other.

The structures of the unit antenna ANT_2-ANT_4 of the complex antenna 60 are the same as that of the unit antenna ANT_1, and after combination, the complex antenna 60 forms a circular symmetric structure, which can be referred to the above explanations, and not repeated herein.

Besides, the side-wall antennas 100-106 of the complex antenna 60 are implemented by the PIFA, i.e. the example of FIG. 4. However, the side-wall antennas 100-106 of the complex antenna 60 may also be implemented by the slot antennas, but not limited thereto.

In summary, the complex antenna of the present invention can effectively increase spatial efficiency, resonance bandwidth and variety for design, and the complex antenna of the present invention disposes the side-wall antennas on the side walls to further achieve multi-band or broadband operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A complex antenna for receiving and transmitting radio signals, comprising:
   four unit antennas, circularly arranged along a circle, for receiving and transmitting radio signals of a first frequency band;
   four side walls, respectively disposed between two adjacent unit antennas of the four unit antennas; and
   a plurality of side-wall antennas, disposed on the four side walls, for receiving and transmitting radio signals of a second frequency band;
   wherein each unit antenna of the four unit antennas comprises:
   a ground metal plate;
   a first patch plate;
   a second patch plate;
   a first feed-in wire, electrically connected to the first patch plate, for transmitting the radio signals of the first frequency band;
   a second feed-in wire, electrically connected to the second patch plate, for transmitting the radio signals of the first frequency band; and
   an insulation fixing unit, for fixing the ground metal plate, the first patch plate and the second patch plate, such that the ground metal plate, the first patch plate and the second patch plate do not come in contact with each other.

2. The complex antenna of claim 1, wherein the first frequency band and the second frequency band are different.

3. The complex antenna of claim 1, wherein the plurality of the side-wall antennas are selected from a planar antenna group, and the planar antenna group at least comprises a slot antenna or a planar inverted-F antenna.

4. The complex antenna of claim 1, wherein included angles between any one of the four side walls and the other three side walls are 90, 180 and 270 degrees.

5. The complex antenna of claim 1, wherein the ground metal plate comprises at least a bend.

6. The complex antenna of claim 5, wherein the at least a bend of the ground metal plate is used for focusing a wave beam generated by the antenna within a predefined range.

7. The complex antenna of claim 1, wherein the first patch plate or the second patch plate comprises at least a bend.

8. The complex antenna of claim 7, wherein the at least a bend of the first patch plate or the second patch plate is used for reducing an area projected onto the ground metal plate by the first patch plate or the second patch plate.

9. The complex antenna of claim 1, further comprising a third patch plate, wherein the insulation fixing unit is further used for fixing the third patch plate between the first patch plate and the second patch plate, such that the first patch plate, the second patch plate and the third patch plate do not come in contact with each other.

10. The complex antenna of claim 1, wherein wire lengths of the first feed-in wire and the second feed-in wire are related to half wavelengths of the radio signals transmitted.

11. A complex antenna for receiving and transmitting radio signals, comprising:
    four unit antennas, circularly arranged along a circle, for receiving and transmitting radio signals of a first frequency band;
    four side walls, respectively disposed between two adjacent unit antennas of the four unit antennas; and
    a plurality of side-wall antennas, disposed on the four side walls, for receiving and transmitting radio signals of a second frequency band;
    wherein each unit antenna of the four unit antennas comprises:
    a metal reflective plane, for reflecting radio signals, to enhance a gain of the complex antenna;
    a first radiation portion, disposed on the metal reflective plane with a first gap to the metal reflective plane;

a second radiation portion, disposed on the first radiation portion with a second gap to the first radiation portion; and a supporting element, for supporting and isolating the metal reflective plane, the first radiation portion and the second radiation portion.

12. The complex antenna of claim 11, wherein a 90 degree angle is included between a first midline of the first radiation portion and a second midline of the second radiation portion.

13. The complex antenna of claim 11, wherein the first radiation portion comprises:

a first triangular metal plate; and
a second triangular metal plate.

14. The complex antenna of claim 13, wherein shapes of the first triangular metal plate and the second triangular metal plate are isosceles triangles.

15. The complex antenna of claim 11, wherein the second radiation portion comprises:

a third triangular metal plate; and
a fourth triangular metal plate.

16. The complex antenna of claim 15, wherein the shapes of the third triangular metal plate and the fourth triangular metal plate are isosceles triangles.

17. The complex antenna of claim 11, wherein the first frequency band and the second frequency band are different.

18. The complex antenna of claim 11, wherein the plurality of the side-wall antennas are selected from a planar antenna group, and the planar antenna group at least comprises a slot antenna or a planar inverted-F antenna.

19. The complex antenna of claim 11, wherein included angles between any one of the four side walls and the other three side walls are 90, 180 and 270 degrees.

* * * * *